S. E. BALL, DEC'D.
M. A. BALL, ADMINISTRATRIX.
FONDANT MIXING MACHINE.
APPLICATION FILED AUG. 5, 1908.
948,949.
Patented Feb. 8, 1910.
3 SHEETS—SHEET 3.
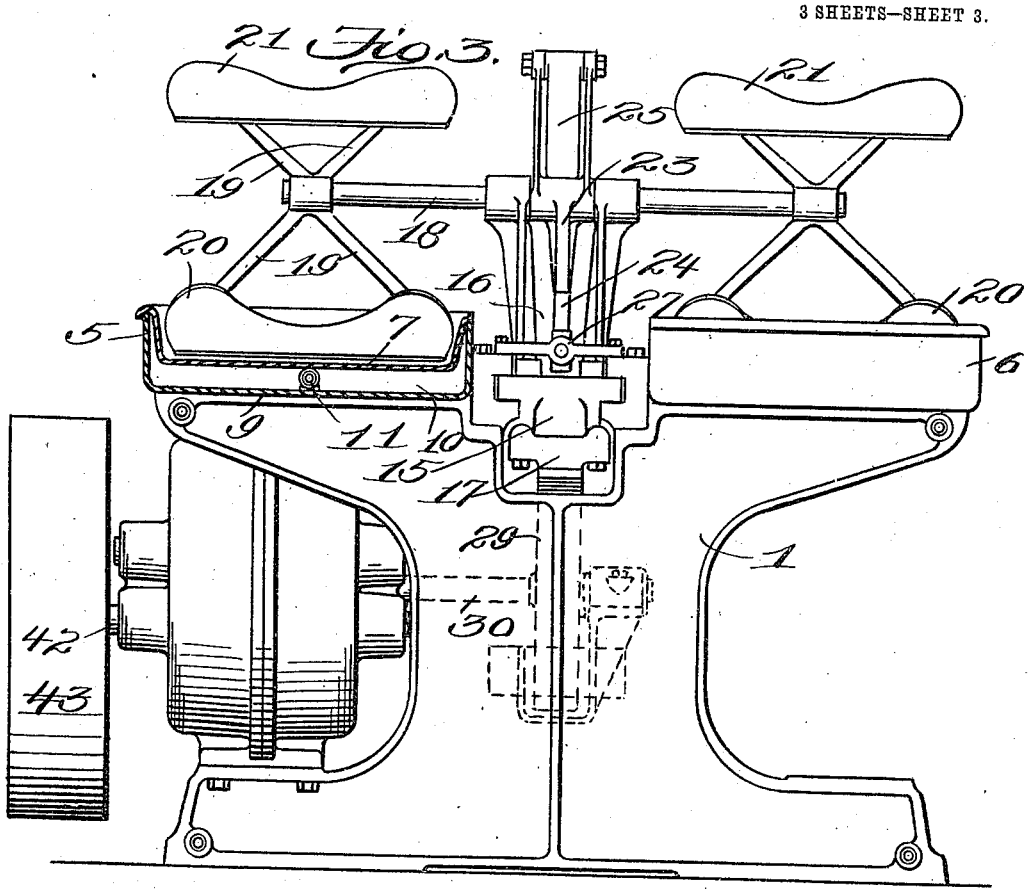
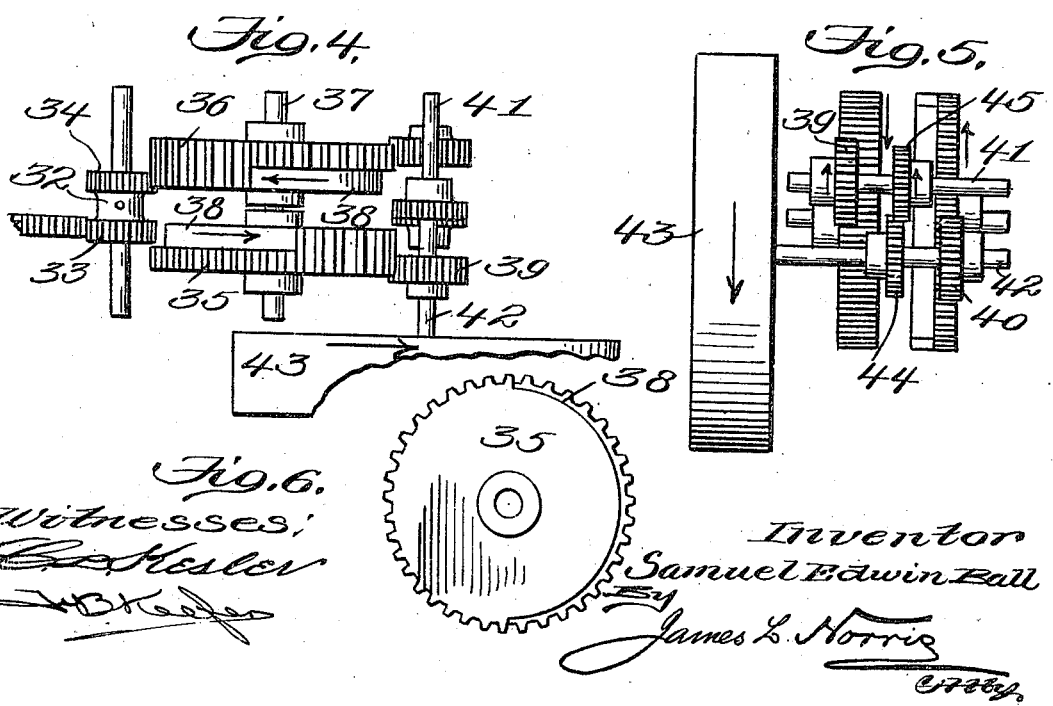

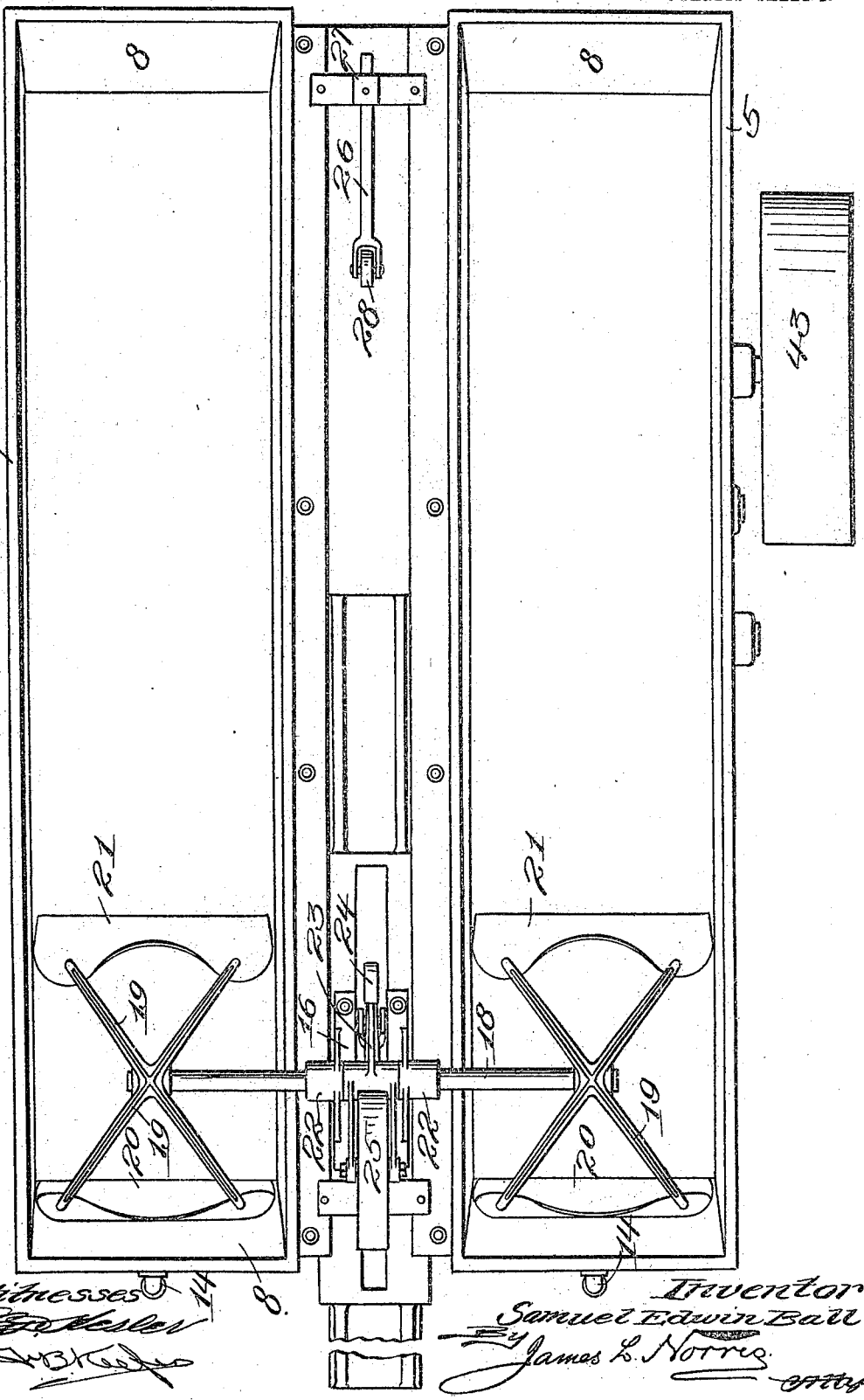

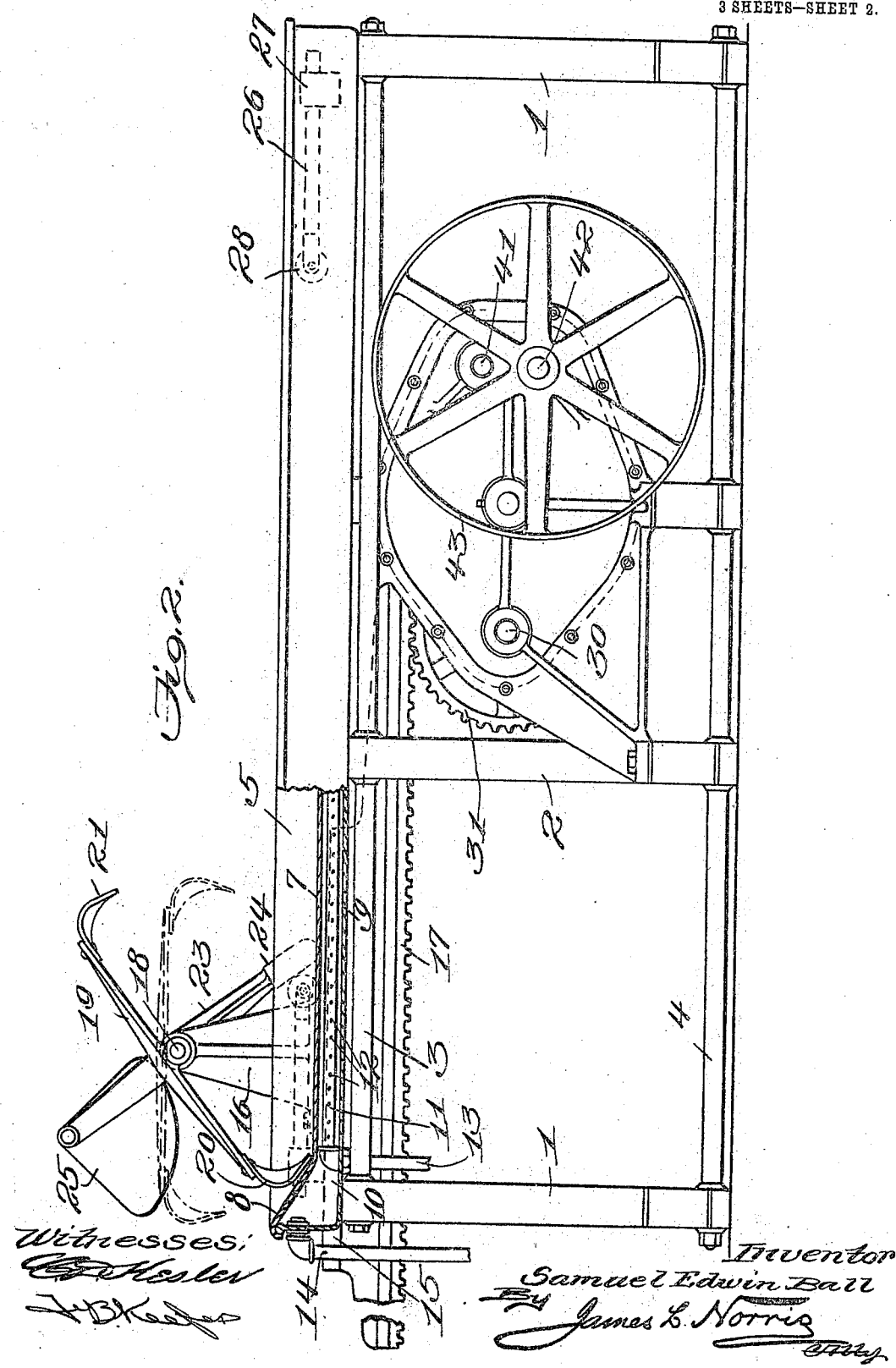

UNITED STATES PATENT OFFICE.

SAMUEL EDWIN BALL, OF DAYTON, OHIO; MINNIE A. BALL ADMINISTRATRIX OF SAID SAMUEL EDWIN BALL, DECEASED.

FONDANT-MIXING MACHINE.

948,949.    Specification of Letters Patent.    Patented Feb. 8, 1910.

Application filed August 5, 1908. Serial No. 447,150.

*To all whom it may concern:*

Be it known that I, SAMUEL EDWIN BALL, a citizen of the United States, residing at Dayton, in the county of Montgomery and State of Ohio, have invented new and useful Improvements in Fondant-Mixing Machines, of which the following is a specification.

This invention relates to machines for mixing and cooling fondant or candy-cream for chocolate creams, bonbons, etc.

In the preparation of fondant or candy-cream or stock for confectionery it is desirable and necessary that it be not only thoroughly mixed or agitated, but uniformly and evenly similarly treated throughout the entire mass, and to obtain this result a shallow receptacle is used in the present instance and coöperating therewith are automatically reversing reciprocatory agitators or mixers which thoroughly work up the entire mass in the receptacle at each reciprocation, both at the side portions and center of the receptacle. The receptacle has a hollow bottom forming a heating chamber supplied with a suitable heating medium preferably in liquid form and through the heating action within the receptacle itself the constituents of the cream or fondant, or sugar, may be boiled to a certain consistency and subsequently rapidly reduced to a cold state to obstruct crystallization. The supply medium for heating the receptacle may also serve as a means for feeding a cooling liquid to the receptacle if desired, and as the receptacle is shallow the heated cream or fondant will be necessarily reduced in temperature at a rapid rate or in a short time as the surface of the cream or fondant is fully exposed to the atmosphere, and this surface exposure conjointly with the lower cooling medium in the receptacle will expeditiously cool the cream or fondant or rapidly eliminate the heat so that when the mixers or agitators are operated the contents of the receptacle will have a condition conducive to the formation of a cream or fondant in a fine, smooth, and velvety condition.

In the drawings: Figure 1 is a top plan view of a machine embodying the features of the invention and shown as comprising two mixing receptacles. Fig. 2 is a side elevation of the machine partially broken away and shown in section. Fig. 3 is an end elevation of the machine. Figs. 4, 5 and 6 are detail views of the preferred form of gearing for reversely reciprocating the agitators or mixers.

Similar characters of reference are employed to indicate corresponding parts in the several views.

The numeral 1 designates end supports which are vertically disposed and coöperate with an intermediate similar support 2 to provide a machine frame and connected by upper and lower longitudinal tie rods or members 3 and 4. In the present construction of the machine as shown, two elongated shallow pans or receptacles 5 and 6 are supported on the frame to increase the capacity of the machine, but it will be understood that the same mechanism for mixing and agitating the cream or fondant may be used with a single receptacle or pan or with more than two receptacles by respectively decreasing and increasing the number of agitators or mixers. Each pan or receptacle is preferably of rectangular form and has a false bottom 7 with upwardly and outwardly inclined extremities 8 which serve as guide means for the mixers or agitators, as will be more fully hereinafter explained. The false bottom 7 is elevated a suitable distance above the main bottom 9 of each pan, to form the latter with a chamber or hollow bottom 10 in which is located a longitudinally extending feed-pipe or conduit 11 provided with a plurality of spray apertures 12 at opposite sides, the pipe or conduit 11 having an exteriorly projecting supply pipe 13 connected thereto and which may extend away any distance from the machine to a source of heating or cooling medium supply. The pipe or conduit 11 preferably extends centrally through the chamber or hollow bottom 10 so as to equally distribute the heating or cooling medium in the chamber and rapidly fill the latter. Each chamber or hollow bottom 10 has an overflow pipe 14 connected to one end thereof which may run back to the same source of supply as that to which the pipe 13 is connected to set up a circulation within the chamber or hollow bottom 10.

Adjacent to the one side of each receptacle or pan or located between the two receptacles or pans as shown is a sliding frame or carriage 15 supporting an upright or pedestal 16 and having a lower operating means which consists, in the present instance, of a rack 17 of such length as to remain in continual mesh or operative association with the actuating gearing or mechanism therefor and thus insure a reliable operation of the frame or carriage 15. The frame or carriage 15 moves alternately toward opposite ends of the receptacle or pan, or the two receptacles or pans, as the case may be, and the actuating mechanism therefor will be so arranged as to automatically reverse the movement thereof without requiring manual attention or shifting of devices to obtain the result sought. A preferred form of actuating mechanism will be hereinafter explained to demonstrate one practical embodiment of the invention, but it will be understood that it is proposed to use any mechanism suitable for the purpose, the essential feature being to have the frame or carriage 12 travel automatically along the side of the receptacle or pan or between the sides of adjacent receptacles or pans and have a self-reversing movement at predetermined intervals.

The mixing or agitating means is held by the upright or pedestal 16 and moves uniformly or in consonance with the frame or carriage 15. The mixing or agitating means comprises a supporting shaft 18 movably held in a suitable bearing in the upper end of the upright or pedestal 16 and projecting in the present instance in opposite transverse directions, or transversely over portions of the receptacles or pans 5 and 6. It is obvious, however, that when the machine comprises only a single pan or receptacle the shaft 18 will extend solely from one side of the upright or pedestal 16, and if more than two receptacles or pans are embodied in a single machine the said shaft will be correspondingly extended. Fixed to and movable with each extremity of the shaft 18 as shown are pairs of divergent arms 19 terminally secured to scoop-shaped drag or plow devices 20 and 21 which with the arms constitute the preferred form of agitators or mixers, the said drags or plows 20 and 21 being reversely arranged so as to be effective for reverse travel or movement longitudinally through each receptacle or pan. The upright or pedestal 16 comprises side bearing members 22, as shown by Fig. 1, between which a controller 23 is mounted and fixed to the shaft 18, the controller being in planes at right angles to the pairs of arms 19 and movable with the frame or carriage 15 at one side of the receptacle or pan or between the two receptacles or pans, as shown. The lower end of the controller 23 is formed with a contact head 24 and the upper extremity is provided with a swinging counterpoise weight 25 which operates to hold the controller in either one of its two positions when located past or to one side of the central vertical plane of the axis or shaft 18. The counterpoise weight 25 will have such resistance as to obstruct any tendency of movement or displacement of either scoop-like drag or plow 20, 21, and hence the agitators or mixers in their reverse operation will be maintained in close contact and proper engaging relation with the cream or fondant in each receptacle or pan.

At opposite extremities of the machine and having proper relative proportions or inward locations with respect to the reverse limit of movement of the frame or carriage 15 are tripping or reversing devices consisting in each instance of an inwardly projecting horizontally disposed rod or support 26 adjustably held at its outer extremity in a bearing device 27 and having a roller 28 at its inner end. As above indicated, this simplified form of tripping or reversing device is similarly positioned at opposite extremities of the machine, and the adjustment of either one or both may be readily accomplished to modify the positions of the agitators or mixers or the time that the latter will change their positions and which may be regulated by surrounding conditions and particular treatments of the cream or fondant required.

The mechanism preferred for operating the frame or carriage 15 includes a spur gear 29 held on a shaft 30 and continually meshing with the rack 17. The shaft 30 also carries a gear 31 similar to the gear 29 and held in continual mesh with an elongated pinion 32, see Fig. 4, and which latter pinion in the present instance has two sets of gear teeth 33 and 34 disposed in operative relation to controlling gears 35 and 36 held on a shaft 37 and having portions of the teeth of each cut away or removed for a distance equal to about one-half of the circumference as at 38, the mutilated portions of these gears, as just explained, being arranged in reverse positions with respect to the teeth 33 and 34 of the pinion 32 so that when the teeth 33, for instance, are cleared by the mutilated portion 38 of the gear 35 the teeth 34 of the pinion 32 will be in mesh with the continuous teeth of the gear 36. The mutilation of the gears 35 and 36 is not effective to entirely remove the teeth, the width of the mutilation being a little greater than the width of the teeth 33 and 34 of the pinion 32, and outside of the mutilations 38 the teeth of the respective gears 35 and 36 continue regularly around the circumference of the said gears and are continually engaged by pinions 39 and 40 secured on shafts 41 and 42, the shaft 41 being above the shaft 42 and the latter constituting the drive shaft and having a suitable band wheel 43 thereon. The shaft 42 has a power transmitting pinion 44 keyed thereto and held in continual mesh with a corresponding pinion 45 on the shaft 41, and through the medium of the gearing as just explained reverse rotations are imparted to the gears 35 and 36 and through the teeth 33 and 34 of the pinion 32 to the receiving spur gear 31, the latter reversely rotating the shaft 30 at intervals and correspondingly changing the direction of movement of the gear 29 in mesh with the rack 17. If the band wheel 43 or the drive shaft 42 is rotated in the direction indicated by the arrow, Figs. 4 and 5, the pinions 40 and 44 will be correspondingly rotated and respectively impart to the gear 36 and pinion 45 a reverse rotation, as indicated also by the arrows. The shaft 41 will be rotated by and through the pinion 45 in a direction reverse to the rotation of the shaft 42, and as the same direction of movement is imparted to the pinion 39 the latter will rotate the gear 35 reversely to the gear 36.

Let it be assumed that the cream or fondant has been prepared in the pan as shown by Fig. 2, for instance, and has reached the proper degree of coolness for agitation or mixing and also that the carriage 15 will be in a position to cause the mixers or agitators to travel longitudinally over the pan or receptacle from left to right. Under these conditions the drag or plow 20 will be held downwardly in close relation to the inclined extremity 8 with its lower edge in position to travel in close relation to the bottom 7 of the receptacle or pan. The carriage 15 moves regularly from left to right and the drag or plow 20 throws up and turns over the cream or fondant throughout the whole width of the pan or uniformly over the entire working area of the pan. This operation continues until the contact head 24 of the controller 23 strikes the roller 28 of the tripping or reversing mechanism at the right, and as the carriage continues to move toward the right the contact head 24 is forced toward the left against the resistance of the counterpoise weight 25 and gradually raises the drag or plow 20 and lowers the similar drag or plow 21, and when the carriage 15 shall have reached the limit of travel toward the right the drag or plow 21 will be down in a position similar to the drag or plow 20 shown at the left of Fig. 2, and without hesitation or material interval, the carriage 15 will start to move toward the left and the cream or fondant will be drawn up and thrown over in a reverse direction until the contact head 24, which will then be located in angular position in advance of the pedestal 16 reaches and is operated by the tripping or reversing mechanism at the left end of the machine and a continuous movement of the carriage toward the left will result in a redisposition of the agitators or mixers as shown by Fig. 2. This reverse operation is rapidly carried on and may be continued until the cream or fondant is in a fine, smooth and velvety condition and ready for use.

The receptacles or pans of the form shown will be found exceptionally convenient for removing the cream or fondant therefrom and also may be readily cleaned as the agitators or mixers, by their position at one side of each pan or receptacle and in view of their oscillation, will clear the top of the pan or receptacle and render the latter easily accessible. It will be understood also that a suitable frame will be provided and connected up to the main frame for supporting the actuating gearing, and, furthermore, the contour of the general frame will be so regulated as to accommodate the application of the several mechanisms and the pans or receptacles thereto.

The improved machine will be found exceptionally effective in its operation and use, particularly in view of its increased capacity within minimized proportions and the expedition and facility in working up successive quantities or charges of cream or fondant in each receptacle or pan.

Having thus described the invention, what is claimed as new, is:

1. In a machine of the class specified, a mixing receptacle, and agitators supported over and held clear of any part of the receptacle and provided with means for automatically projecting them into the receptacle in alternation and for reversing the direction of their movement when reaching the opposite extremities of the receptacle.

2. In a machine of the class specified, a mixing receptacle, and automatically operating mixers alternately projecting into and movable longitudinally over the mixing receptacle in reverse directions and having terminal plow devices which extend approximately across the bottom of the said mixing receptacle.

3. In a machine of the class specified, a mixing receptacle, and automatically operating reversible mixers movable longitudinally thereover in reverse directions and having terminal plow devices which extend approximately over the width of the bottom of the said mixing receptacle.

4. In a machine of the class specified, a mixing receptacle, and mixers automatically movable thereover and having a self-reversing actuation at intervals, to alternately project them into the receptacle the mixers being provided with terminal scoop-shaped plow devices which extend approximately over the full width of the bottom of the mixing receptacle.

5. In a machine of the class specified, a mixing receptacle, and self-reversing mixers alternately projected thereinto and having automatically operating weight means to maintain the mixers in proper position in the mixing receptacle.

6. In a machine of the class specified, a mixing receptacle, a horizontal axis extending over and supported clear of the receptacle, and mixers mounted solely on the axis and having means for automatically projecting them into the receptacle in alternation, the axis and the mixers being movable longitudinally over the receptacle and reversing when reaching the terminals of the receptacle.

7. In a machine of the class specified, a mixing receptacle, a carriage movable longitudinally along one side of the receptacle when clear of the latter and having a horizontal shaft extending transversely over the top portion of the receptacle, mixers movably mounted on the shaft and depending into the receptacle, and means for reversing and alternately projecting the mixers into the receptacle, the mixers changing operative position with relation to the receptacle at the ends of the latter.

8. In a machine of the class specified, a mixing receptacle, a horizontal axis disposed above and longitudinally movable over the receptacle, an agitating means mounted on the axis and embodying mixers which are alternately projected into the receptacle, and means for moving one mixer into and raising the other from the receptacle when the agitating means reaches the terminals of the receptacle.

9. In a machine of the class specified, a mixing receptacle having a bottom with end inclined portions, and agitators movable longitudinally with relation to the said receptacle and having a self-reversing operation when arriving at and over the inclined portions of the bottom, to alternately project the agitators into the receptacle when reaching the inclined portions of the said bottom the agitators being provided with plow devices which extend approximately across the bottom of the receptacle.

10. In a machine of the class specified, a mixing receptacle, a carriage movable along one side of the receptacle and carrying a horizontal axis projecting over the latter, and mixers movably supported on the axis and automatically operated to project them alternately into the receptacle, the mixers being carried by a rigid means.

11. In a machine of the class specified, a mixing receptacle having a chambered bottom provided with liquid supply and outflow means, and agitators movable longitudinally over the receptacle and automatically operated to alternately project them into the receptacle when reaching opposite terminals of the latter, the agitators when in engagement with the bottom of the receptacle extending approximately across the said bottom.

12. In a machine of the class specified, a mixing receptacle, a carriage disposed exteriorly of and at one side of the receptacle and supporting mixers movable longitudinally over the receptacle, the mixers being intermittently oscillated to alternately project the same into the receptacle, and mechanism coöperating with the carriage for automatically changing the direction of movement of the carriage when reaching the extremities of the receptacle.

13. In a machine of the class specified, a mixing receptacle, a movable means exterior of and at one side of the receptacle and carrying a horizontal axis projecting transversely over the latter, mixing devices supported by said axis and intermittently oscillated to alternately project the same into the receptacle, and mechanism for reversing the travel of said movable means and also for changing the position of the mixing devices relatively to the receptacle.

14. In a machine of the class specified, a mixing receptacle, a carriage disposed at one side of the receptacle and movable longitudinally in relation to the latter and having a rack fixed thereto and a shaft projecting over the receptacle, mixing devices mounted on the shaft and having an intermittent oscillation to alternately project the said devices into the receptacle, and operating means for the carriage including a gear device meshing with the rack and means for automatically reversing the movement of said rack and correspondingly reversing the movement of the carriage.

15. In a machine of the class specified, a mixing receptacle, mixing devices movable in reverse directions over and coöperating with the mixing receptacle, a weighted controller for holding the mixing devices in operative position, and means for engaging the controller for bringing opposite mixing devices into operative relation to the receptacle.

16. In a machine of the class specified, a mixing receptacle, oscillatable mixing devices movable over the receptacle in reverse directions, a controller associated with the mixing devices and provided with means for holding the said devices alternately in operative relation to the receptacle, and means for engaging the controller and oscillating the latter and the mixing devices to individually bring either one of said devices into operative relation to the mixing receptacle.

17. In a machine of the class specified, a mixing receptacle, a carriage located exteriorly of and movable longitudinally in relation to the mixing receptacle and carrying a shaft means projecting over the receptacle, an arm intermediately secured to and movable with the shaft and having agitating means at opposite extremities to alternately project into the receptacle, a weighted arm intermediately secured to the shaft to hold the agitating means in proper position in the receptacle, and means at opposite ends and exteriorly of the receptacle to engage the weighted arm to reverse the agitating means and the arm carrying the same.

18. In a machine of the class specified, a mixing receptacle, agitators movable in reverse directions over the receptacle and alternately projected into the latter, and means at opposite extremities and exterior of the receptacle for reversing the agitators.

In testimony whereof I have hereunto set my hand in presence of two subscribing witnesses.

SAMUEL EDWIN BALL.

Witnesses:
 JOSEPH B. MURPHY,
 ARTHUR E. LEEN.